(12) United States Patent
Anemone et al.

(10) Patent No.: US 6,817,676 B2
(45) Date of Patent: Nov. 16, 2004

(54) TRUCK HAVING A DUMPING BIN AND STORAGE COMPARTMENT WITH ATTACHED RAMP, AND A SYSTEM AND METHOD FOR TRANSPORTING ARTICLES

(76) Inventors: Marco Anemone, 4221 N. Saint Louis, Chicago, IL (US) 60618; Mario Anemone, 3347 N. Ozanam, Chicago, IL (US) 60634

( * ) Notice: Subject to any disclaimer, the term of this patent is extended or adjusted under 35 U.S.C. 154(b) by 0 days.

(21) Appl. No.: 10/124,512

(22) Filed: Apr. 17, 2002

(65) Prior Publication Data

US 2003/0197417 A1 Oct. 23, 2003

(51) Int. Cl.⁷ .................................................. B60P 1/16
(52) U.S. Cl. ...................... 298/18; 298/8 R; 298/22 R
(58) Field of Search ............................ 298/8 R, 8 T, 13, 298/17.7, 18, 22 R; 414/537, 470; 296/181, 183, 57.1, 61

(56) References Cited

U.S. PATENT DOCUMENTS

| | | |
|---|---|---|
| 1,732,461 A | 10/1929 | Cummings et al. |
| 2,811,111 A | 10/1957 | Levitz et al. |
| 2,906,557 A | 9/1959 | Garabedian et al. |
| 2,929,658 A | 3/1960 | Killebrew |
| 3,236,562 A | 2/1966 | Maxon, Jr. |
| 3,293,679 A | 12/1966 | Murphy |
| 3,711,157 A * | 1/1973 | Smock ........................ 298/8 R |
| 4,470,747 A | 9/1984 | Tichenor |
| 4,647,270 A | 3/1987 | Maloney |
| 4,830,436 A | 5/1989 | Sockwell et al. ........... 298/8 R |
| 4,966,510 A | 10/1990 | Johnson, Jr. |
| 4,979,866 A | 12/1990 | Croy |
| 5,176,488 A | 1/1993 | Boda |
| 6,019,431 A | 2/2000 | Rexus et al. ........... 298/23 MD |
| 6,102,646 A | 8/2000 | Bass et al. |
| 6,199,955 B1 * | 3/2001 | Rogers ........................ 298/18 |
| 6,206,477 B1 | 3/2001 | Rexus et al. ........... 298/23 MD |
| 6,601,924 B1 * | 8/2003 | Hicks ........................ 298/8 R |

* cited by examiner

Primary Examiner—Stephen Gordon
(74) Attorney, Agent, or Firm—Patents + TMS, P.C.

(57) ABSTRACT

A truck has a cab wherein a dumping bin and a storage compartment are attached to the cab. The dumping bin may be tilted to facilitate dumping of items placed within the dumping bin. The dumping bin may be operated from within the cab. The storage compartment has a ramp attached to the storage compartment. The ramp may be raised or lowered to enable a user to load or unload items from the storage compartment. A system and a method for transporting articles are also provided.

16 Claims, 7 Drawing Sheets

TRUCK HAVING A DUMPING BIN AND STORAGE COMPARTMENT WITH ATTACHED RAMP, AND A SYSTEM AND METHOD FOR TRANSPORTING ARTICLES

BACKGROUND OF THE INVENTION

The present invention generally relates to a truck, a system and a method for transporting articles having a dumping bin and a storage compartment attached to a cab of the vehicle. More specifically, the present invention relates to a truck having a dumping bin attached to the cab wherein the dumping bin may be operated from within the cab. The truck further has a storage compartment having a ramp attached to the storage compartment. The ramp may be lowered to enable loading and unloading of the truck. The ramp may also be raised to provide a gate for the storage compartment.

It is, of course, generally known to load and/or unload materials, equipment or the like onto a vehicle. A truck is one example of a vehicle onto which a user may load or unload materials or equipment. Known trucks may have a cab having a storage compartment attached to the cab. The storage compartment may have an interior which may hold various materials, such as products, equipment, waste products, or other items.

Often, the storage compartment is elevated which may cause difficulty for a user to load or unload the truck. In some instances, a ramp is positioned adjacent to the loading area of the truck to reduce the amount of work required to place materials within the storage compartment. However, positioning a ramp proximate to the loading area of the truck is often a labor-intensive task.

Certain other trucks may have a dumping bin attached to the cab into which a user may place waste products. The dumping bin may be positioned next to a dumping site and may be tilted to an angle, causing items within the dumping bin to exit the dumping bin. A user generally operates the dumping bin by exiting the cab of the truck and actuating the appropriate button, lever or like device to tilt the dumping bin. Exiting the cab may be inconvenient in certain instances. For example, the user may attempt to position the dumping bin near a dumping area. The proximity of the truck to the dumping area may cause the user difficulty in exiting the cab. In other instances, such as inclement weather, the user is inconvenienced by having to exit the cab of the truck to operate the dumping bin.

Trucks are often implemented in the landscaping industry, particularly, transporting of landscaping equipment and/or materials to the site requiring landscaping work and removal of rubbish and the like from the site. A landscaper loads and unloads the necessary landscaping equipment and/or materials onto a truck or other vehicle for transport to the site. The landscaper may also be required to store and remove waste products from the landscaping site. These duties are often difficult to perform due to deficiencies of known trucks.

A need, therefore, exists for a truck, a system and a method for transporting articles having a cab and a dumping bin attached to the cab wherein the dumping bin may be operated from inside the cab. A further need exists for a truck, a system and a method for transporting articles having a cab and a storage compartment attached to the cab wherein the storage compartment further has a ramp which may be raised or lowered to load or unload the storage compartment.

SUMMARY OF THE INVENTION

The present invention provides a truck, a system and a method for transporting articles having a cab wherein a dumping bin and a storage compartment are attached to the cab. The dumping bin may be tilted to facilitate dumping of materials placed within the dumping bin. The dumping bin may be operated from within the cab. The storage compartment has a ramp attached to the storage compartment. The ramp may be raised or lowered to assist with loading or unloading materials from the storage compartment.

To this end, in an embodiment of the present invention, a truck is provided. The truck has a cab having a body having walls defining an interior. A bed is provided extending along a horizontal plane between a front end and a rear end wherein the front end is closest to the cab and the rear end is furthest from the cab and further wherein the bed is defined along an axis extending from the front end to the rear end. Also provided is a dumping bin having walls and a base defining an interior wherein the dumping bin is positioned at the front end of the bed and further wherein the dumping bin moves in a direction perpendicular to the axis of the bed. A cylinder is positioned adjacent to the base of the dumping bin wherein the cylinder moves the dumping bin. A storage compartment is provided having walls defining an interior and is positioned on the bed adjacent to the dumping bin. A controller in communication with the cylinder is also provided wherein the controller is located within the interior of the cab and further wherein the controller is activated to move the dumping bin in the direction perpendicular to the axis of the bed.

In an embodiment, the truck has a ramp attached to the storage compartment.

In an embodiment, the truck has a winch attached to the storage compartment wherein the winch is controlled by the controller.

In an embodiment, the truck has a panel on the dumping bin wherein the panel is controlled by the controller.

In an embodiment, the truck has a retractable door providing access to the storage compartment.

In an embodiment, the dumping bin is positioned between the cab and the storage compartment.

In an embodiment, the truck has a door providing access to the storage compartment.

In an embodiment, the truck has a ramp attached to the storage compartment wherein the ramp has a first section and a second section wherein each of the first section and the second section is independently movable.

In an embodiment, the dumping bin and the storage compartment are attached to the bed.

In an embodiment, the truck has a section of the storage compartment extending from the interior of the storage compartment to an end of the storage compartment wherein the section has a declining slope.

In another embodiment of the present invention, a system is provided. The system has a cab having a body and walls defining an interior wherein the cab has a bed extending from the body between a first end and a second end defining an axis of the bed. The system also has a dumping bin having a body defined by walls and a base wherein the dumping bin is positioned on the bed and moves perpendicular to the axis. Also provided is a cylinder positioned between the bed and the dumping bin. A panel is positioned on the dumping bin between one of the walls and the base. In addition, a controller is positioned within the cab wherein the controller is in communication with the cylinder and causes the cylinder to move the dumping bin.

In an embodiment, the system has a storage compartment having walls defining an interior positioned on the bed adjacent to the dumping bin.

In an embodiment, the system has a retractable door positioned adjacent to the bed.

In an embodiment, the system has a ramp positioned adjacent to the bed.

In an embodiment, the system has a winch in communication with the controller.

In an embodiment, the panel may be moved into a position and locked in the position.

In another embodiment of the present invention, a method for transporting articles in a vehicle to assist in delivery and/or hauling of items from a site wherein the vehicle has a cab and a bed extending from the cab defining a length between a first end and a second end is provided. The method comprises the steps of: storing the articles in a compartment on the bed at the second end of the truck wherein the compartment has an interior for holding the articles; attaching a ramp to the compartment securing the articles in the interior of the compartment; and positioning a bin between the compartment and the cab wherein the bin tilts in only one direction transverse to the length of the bed.

In an embodiment, the method comprises an additional step of lowering the ramp from the compartment wherein the ramp has a first section and a second section independently positionable.

In an embodiment, the method comprises an additional step of raising the bin with a cylinder between the bed and the bin.

In an embodiment, the method comprises an additional step of controlling the position of the bin from within the cab.

It is, therefore, an advantage of the present invention to provide a truck, a system and a method for transporting articles which enables a user to load, transport and unload materials, the truck having a cab and further having a dumping bin and a storage compartment attached to the cab.

Another advantage of the present invention to provide a truck, a system and a method for transporting articles which enables a user to operate a dumping bin from within a cab of the truck.

Still another advantage of the present invention is to provide a truck, a system and a method for transporting articles which enables more efficient dumping of materials placed within a dumping bin of the truck.

Yet another advantage of the present invention is to provide a truck, a system and a method for transporting articles having a ramp attached to a storage compartment wherein the ramp may be raised or lowered.

A still further advantage of the present invention is to provide a truck, a system and a method for transporting articles having a ramp attached to a storage compartment which enables loading and unloading of materials from the storage compartment.

Moreover, an advantage of the present invention is to provide a truck, a system and a method for transporting articles having a ramp attached to a storage compartment wherein the ramp may be raised or lowered by actuation of a controller located within the interior of the cab.

Yet another advantage of the present invention is to provide a truck, a system and a method for transporting articles having a ramp attached to a storage compartment, wherein individual sections of the ramp may be raised or lowered.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally provides a truck, a system and a method for transporting articles having a cab wherein a dumping bin and a storage compartment are attached to the cab. The dumping bin may be raised or lowered by a hydraulic cylinder. Moreover, raising or lowering of the dumping bin may be controlled by a controller within an interior of the cab. The storage compartment may have a ramp attached that may be raised or lowered to assist with loading or unloading materials, equipment or the like from the storage compartment. The ramp may be operated manually or may be operated remotely.

Figure 1:
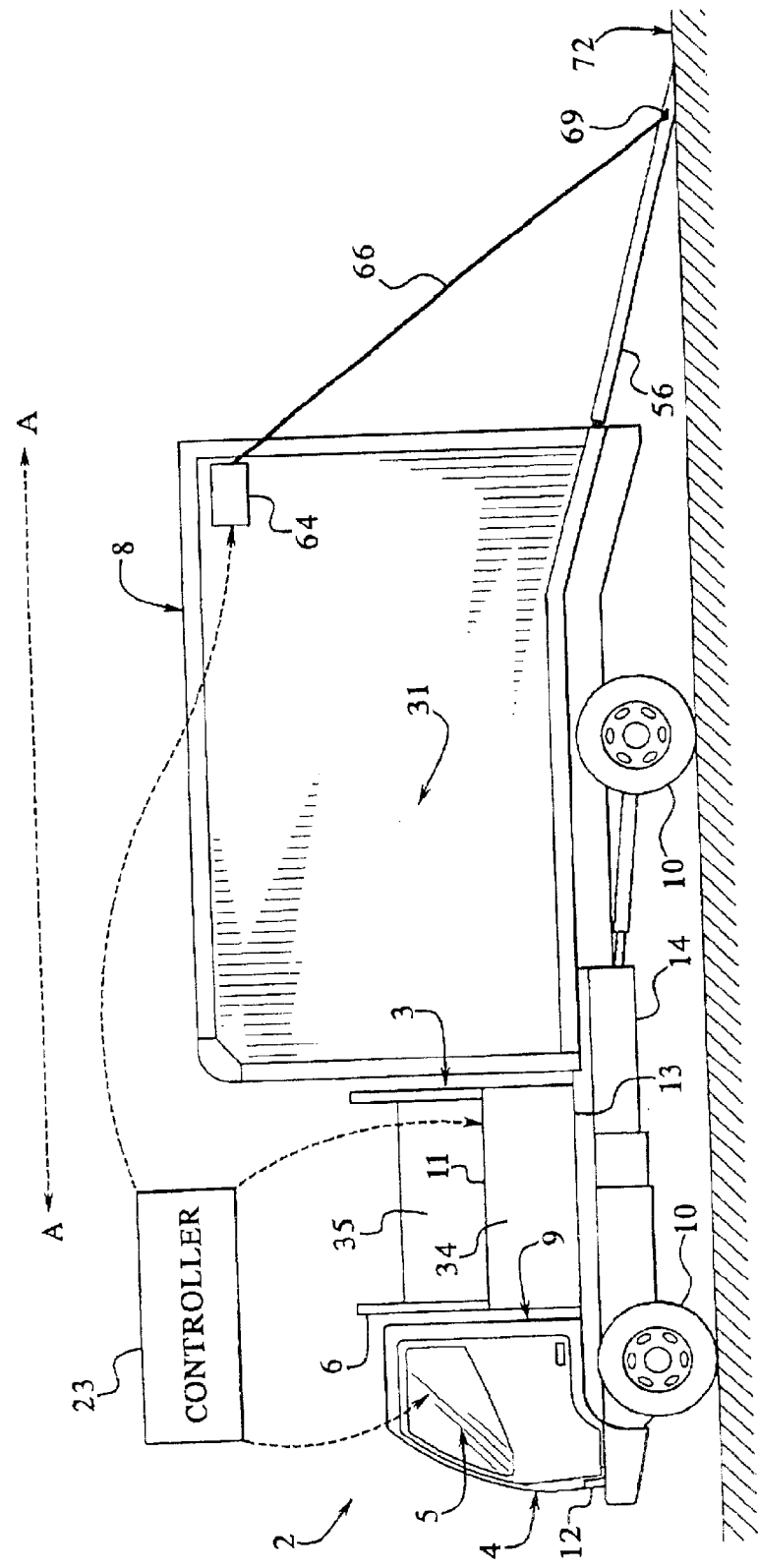
FIG. 1 illustrates a side view of a truck in an embodiment of the present invention.

Referring now to the drawings wherein like numerals refer to like parts, FIG. 1 illustrates a truck 2 in an embodiment of the present invention. The truck 2 may have a cab 4, a dumping bin 6 and a storage compartment 8. The dumping bin 6 may be positioned adjacent to the cab 4 with the storage compartment 8 adjacent to a rear 3 of the dumping bin 6 as generally illustrated in FIG. 1.

The cab 4 may have conventional features, such as, for example, wheels 10. In addition, the cab 4 may have a front portion 12 which may house an engine (not shown). The front portion 12 may define an interior 5 of the cab 4 in which a user may sit when operating the truck 2. A fuel tank 25 may be attached to the cab 4 at a side 7 of a bed 14 of the cab 4.

The bed 14 may extend from a rear 9 of the front portion 12. The bed 14 is preferably constructed of metal. The bed 14 may have a body defined by a horizontal plane and may be a length for the dumping bin 6 and the storage compartment 8 to be positioned on the bed 14. In an embodiment, the dumping bin 6 and/or the storage compartment 8 may be attached to the bed 14 by fasteners, welding, or other like devices. The bed 14 may generally extend for a length defined by a longitudinal axis shown by the line A—A in FIG. 1.

Figure 2:
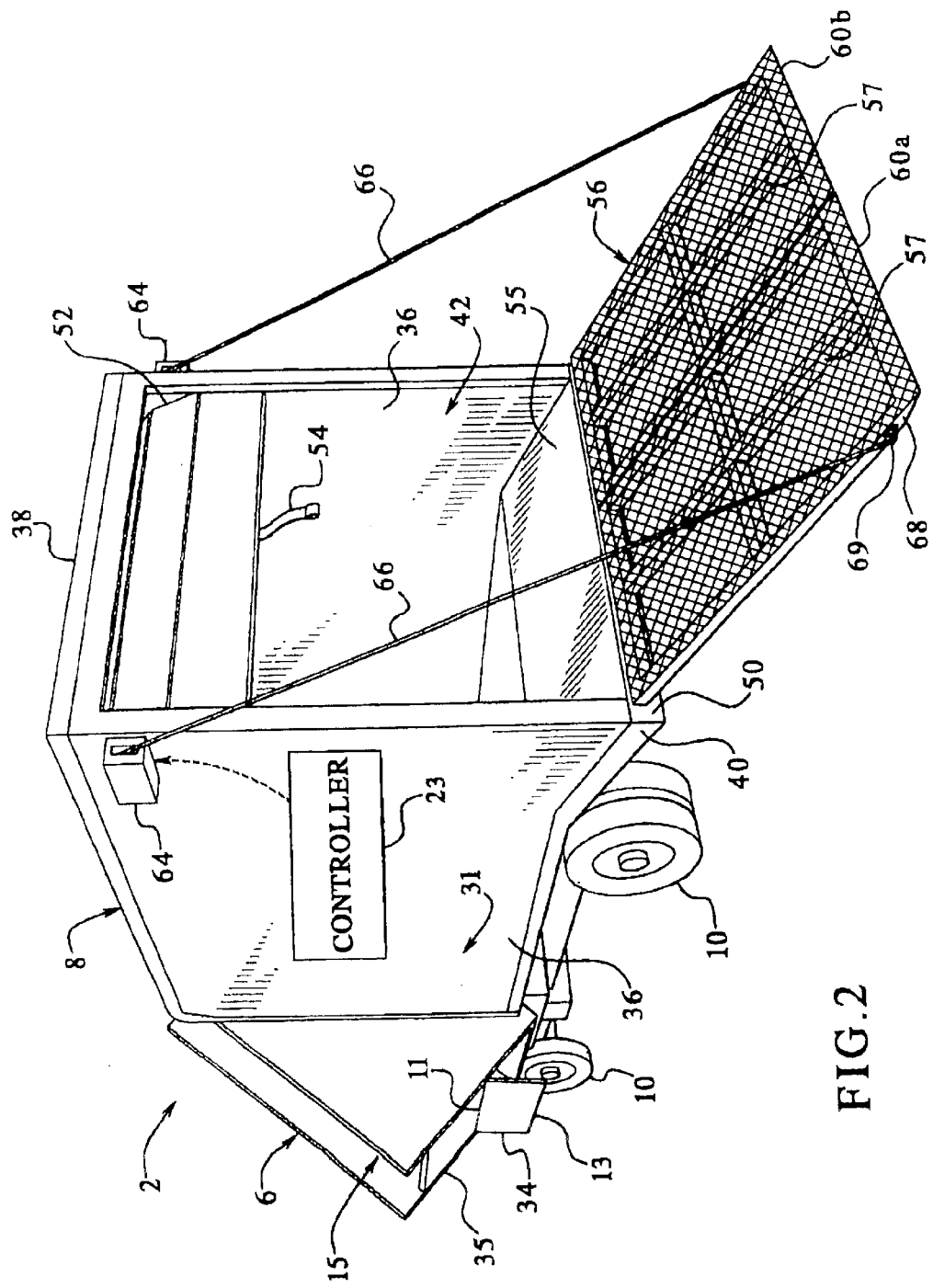
FIG. 2 illustrates a rear perspective view of the truck in an embodiment of the present invention.

The dumping bin 6 may have a base portion 18. Preferably, the base portion 18 is constructed from metal; however, any other material apparent to those skilled in the art may be implemented. The base portion 18 may be positioned adjacent to a cylinder 20. The cylinder 20 may have a hydraulic piston 21 which may raise, lower or support the dumping bin 6. In an embodiment, the hydraulic piston 21 may be attached to a base 22 of the dumping bin 6 by a plate 24. The plate 24 may be fastened by screws, bolts, welding or the like. In an embodiment, the plate 24 may be integrally formed with the base 22. FIG. 2 illustrates the plate 24 attached at a specific location of the base 22; however, the plate 24 may be attached to the base 22 at any location between the base 22 and the bed 14 such that the hydraulic piston 21 may raise, lower or support the dumping bin 6. The base 22 of the dumping bin 6 may be constructed from wood, metal, plastic, or any other material apparent to those skilled in the art. The base 22 may have beams 26 to provide support to the dumping bin 6.

The dumping bin 6 may have walls 28 on opposite sides of the dumping bin 6. The walls 28 may be constructed from wood, metal or other like material. The base 22 of the dumping bin 6 may be sized to be positioned between the cab 4 and the storage compartment 8 and may have a width approximately equal to the width of the bed 14. The height of the dumping bin 8 may be approximately equal to or less than the height of the cab 4. The interior 15 of the dumping bin 6 may be sufficient to house items, such as, for example, grass clippings, mulch or the like.

Figure 3:
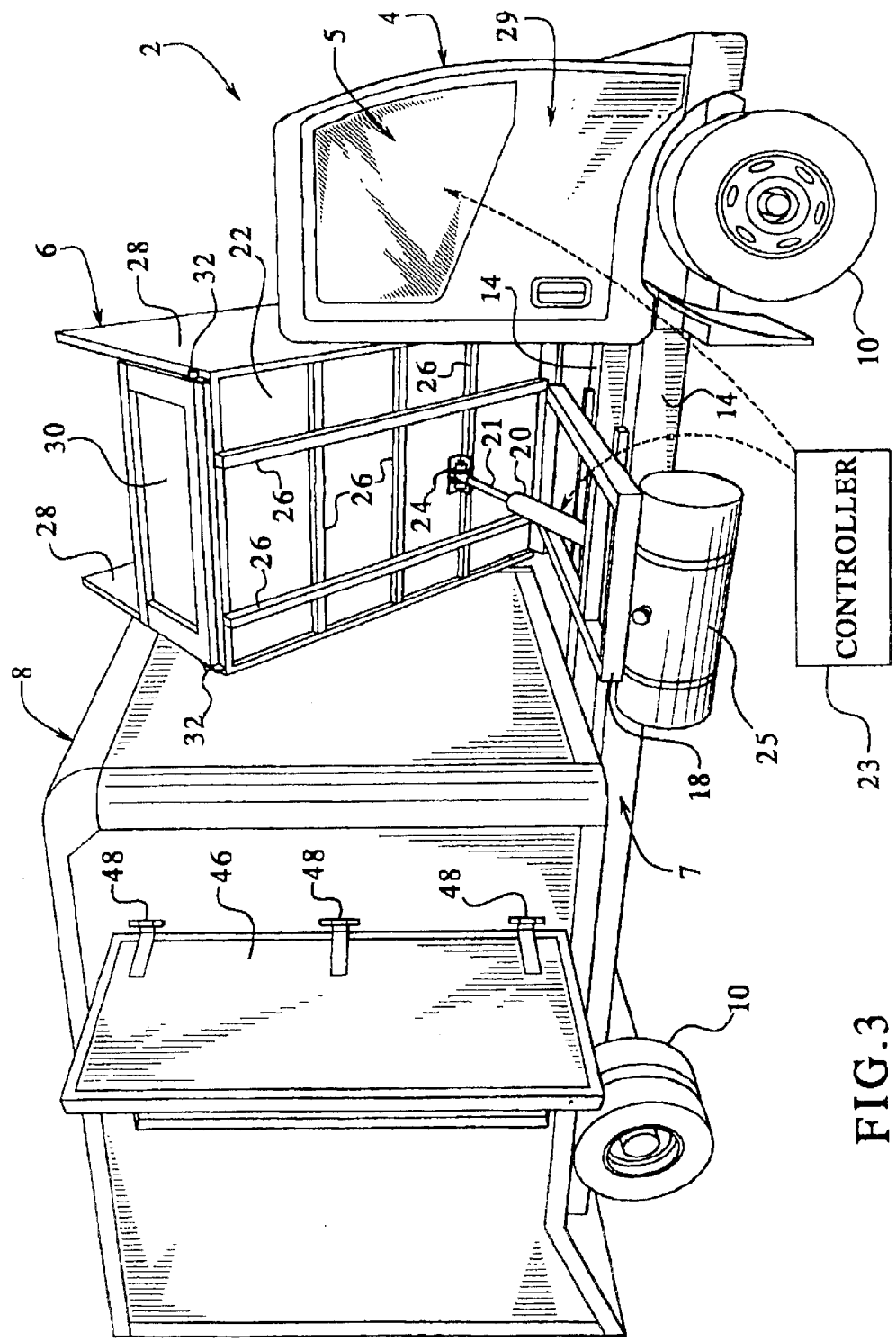
FIG. 3 illustrates a side perspective view of the truck in an embodiment of the present invention.

The dumping bin 6 may also have a door 30 which may be positioned perpendicular to the walls 28. FIG. 3 illustrates the door 30 on a passenger side 29 of the truck 2; however, the door 30 may be positioned on the dumping bin 6 on either one of the passenger side 29 or a driver side 31 of the truck 2 or both sides. The door 30 may be connected to the walls 28 of the dumping bin 6 at hinges 32 and may be locked when in an upright or closed position. The door 30 may then prevent items within the dumping bin 6 from falling from the dumping bin 6.

The dumping bin 6 may also have a panel 34, preferably constructed of metal. However, the panel 34 may also be constructed of any material apparent to those skilled in the art. The panel 34 may be located between a wall 35 and the base 22 and may have a body defined by a plane. FIG. 1 illustrates the panel 34 as positioned between the wall 35 and the base 22 of the dumping bin 6 on the driver side 31 of the truck 2. However, the panel 34 may be located on either the driver side 31 or the passenger side 29 of the truck 2 or both sides.

Figure 5:
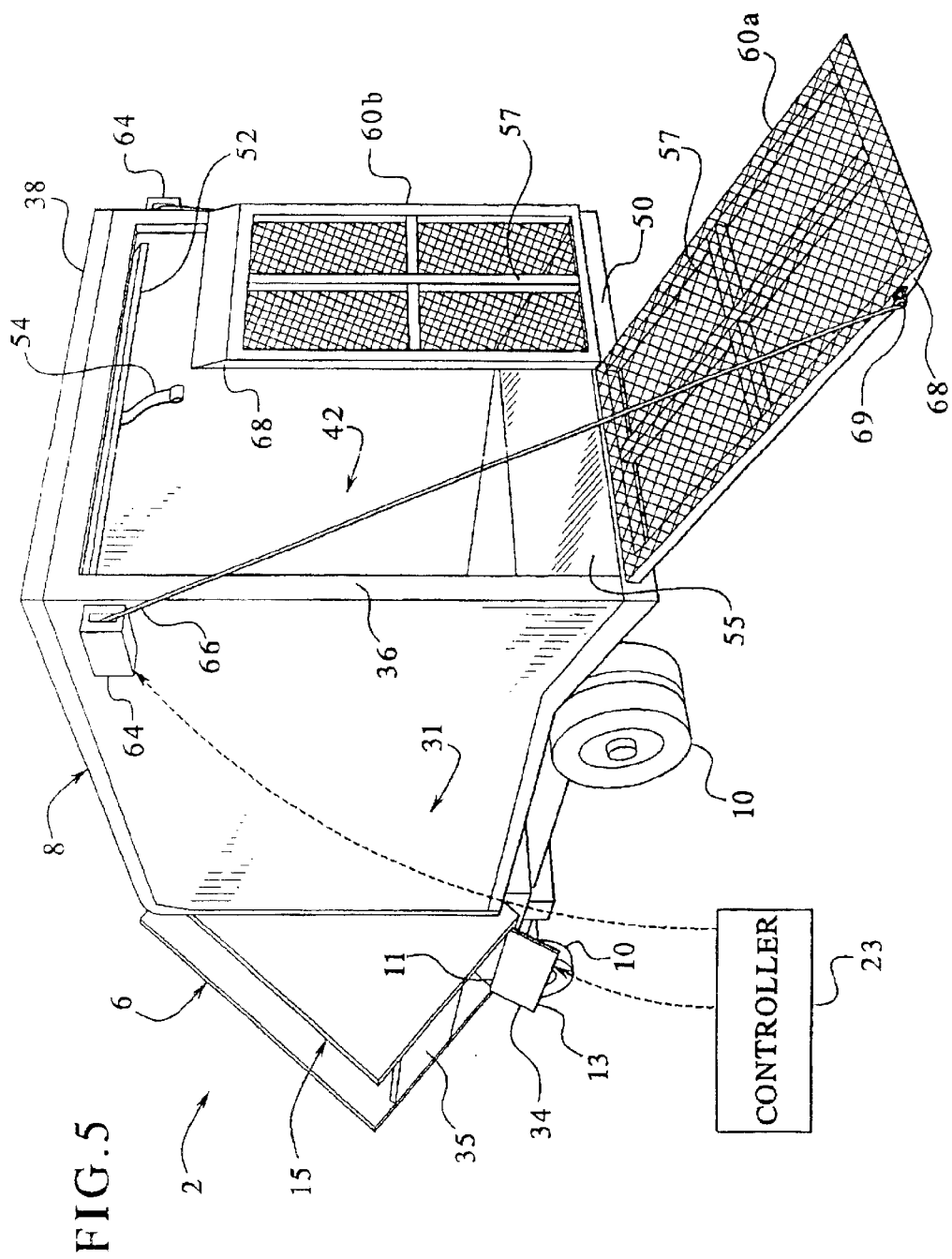
FIG. 5 illustrates a rear perspective view of the truck in an embodiment of the present invention.
Figure 6:
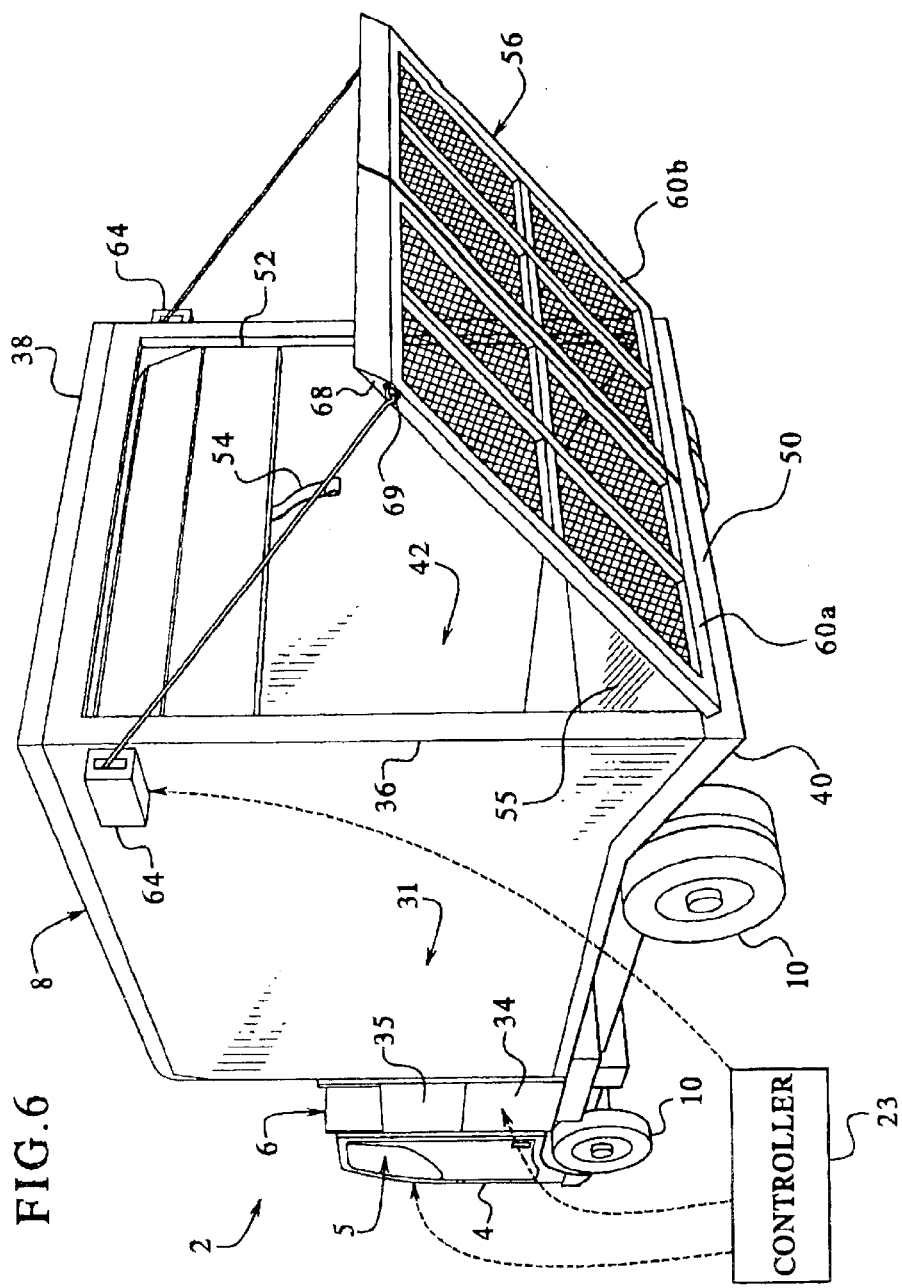
FIG. 6 illustrates a rear perspective view of the truck in an embodiment of the present invention.
Figure 7:
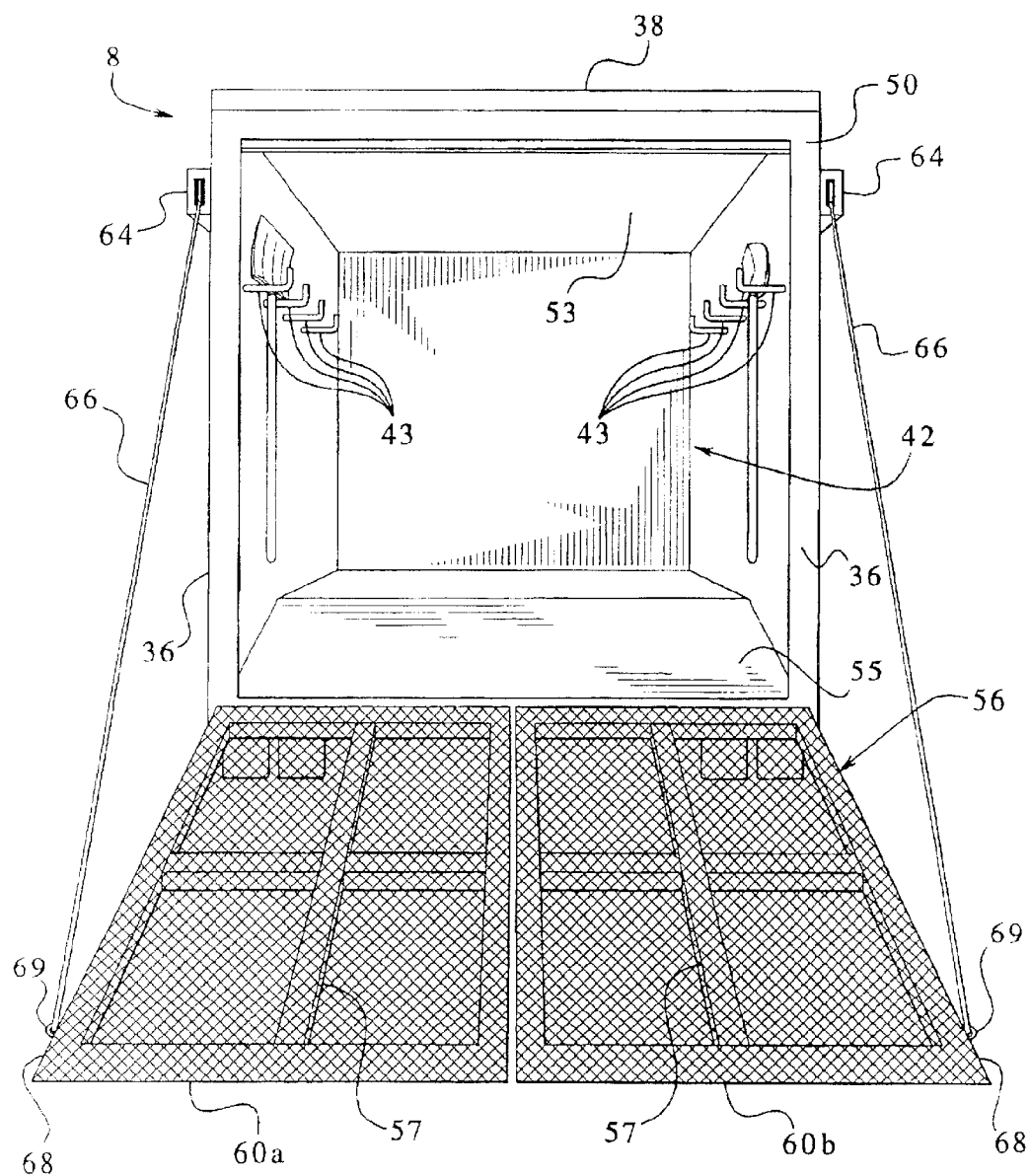
FIG. 7 illustrates a rear view of the truck in an embodiment of the present invention.

The panel 34 may be connected to the dumping bin 6 by a hinge (not shown) at a top 11 or a bottom 13 of the panel 34, as illustrated in FIGS. 2 and 5. The panel 34 may open towards an interior 15 of the dumping bin 6. The panel 34 may also open in an opposite, or outward, direction. In addition, the hinge may be locked to maintain the panel 34 in a position for securing items within the dumping bin 6. The hinge may also be locked when the panel 34 is in an open or outward position to allow items to be placed within or removed from the dumping bin 6. The panel 34 may be positioned manually. Alternatively, the panel 34 may be positioned by a motor (not shown) adjacent to the panel 34 which is controlled by a controller 23. The controller 23 may be located within the interior 5 of the cab 4.

Referring now to FIG. 2, the cylinder 20 and the hydraulic piston 21 may also be controlled by the controller 23. Accordingly, a user may activate the controller 23 from within the cab 4 to force the hydraulic piston 21 to lift or to raise the dumping bin 6. As a result, the dumping bin 6 may then be raised or tilted toward the driver side 31 as illustrated. However, the dumping bin 6 and the cylinder 20 may be positioned such that the dumping bin 6 may tilt towards the driver side 31 or the passenger side 29 of the truck 2. Preferably, the dumping bin 6 may be moved in a direction perpendicular to the longitudinal axis A—A of the bed 14. In a raised position, the user may activate the controller 23 to position the panel 34 in an open position to enable items within the dumping bin 6 to be placed within or be removed from the dumping bin 6.

Referring to FIG. 1, the storage compartment 8 may be constructed from wood, metal, or any other material apparent to those skilled in the art. The storage compartment 8 may have walls 36, a top 38 and a base 40 defining an interior 42 of the storage compartment 8 as illustrated in FIG. 2. The storage compartment 8 may have a length greater than that of the dumping bin 6 and may have a height greater than that of the dumping bin 6 and the cab 4. The width of the storage compartment 8 may be approximately equal to that of the bed 14. The interior 42 may be sized to store equipment or other items, such as, for example, mowers, trimmers, blowers or the like. The interior 42 may also house waste items such as, for example, trees, bushes, or the like. Tools or other items may be hung, for example, on hooks 43 which may be attached to the walls 36. A door 46 may be positioned on the storage compartment 8 as illustrated in FIG. 3. The door 46 may be positioned on either the passenger side 29 or the driver side 31 of the storage compartment 8. The door 46 may be connected to the wall 36 by hinges 48 and may provide access to the interior 42 of the storage compartment 8.

A retractable door 52 may be provided at a rear end 50 of the storage compartment 8. The retractable door 52 may be constructed from wood, metal, or other like material. The retractable door 52 may slide upwards or downwards along rails (not shown). When the retractable door 52 is opened, a portion of the retractable door 52 may be positioned adjacent to a ceiling 53 within the interior 42 of the storage compartment 8. Attached to the retractable door 52 may be a handle 54 which may enable the user to open or close the retractable door 52.

The base 40 of the storage compartment 8 may extend parallel to a floor or ground 72 and may have a section 55 having a downward slope. The section 55 may extend from a point within the interior 42 of the storage compartment 8 to a rear end 50 of the storage compartment 8. The downward slope of the section 55 may assist in loading and unloading of items from the storage compartment 8 when a ramp 56 (described in further detail hereinafter) is positioned to lead into the interior 42 of the storage compartment 8.

Figure 4:
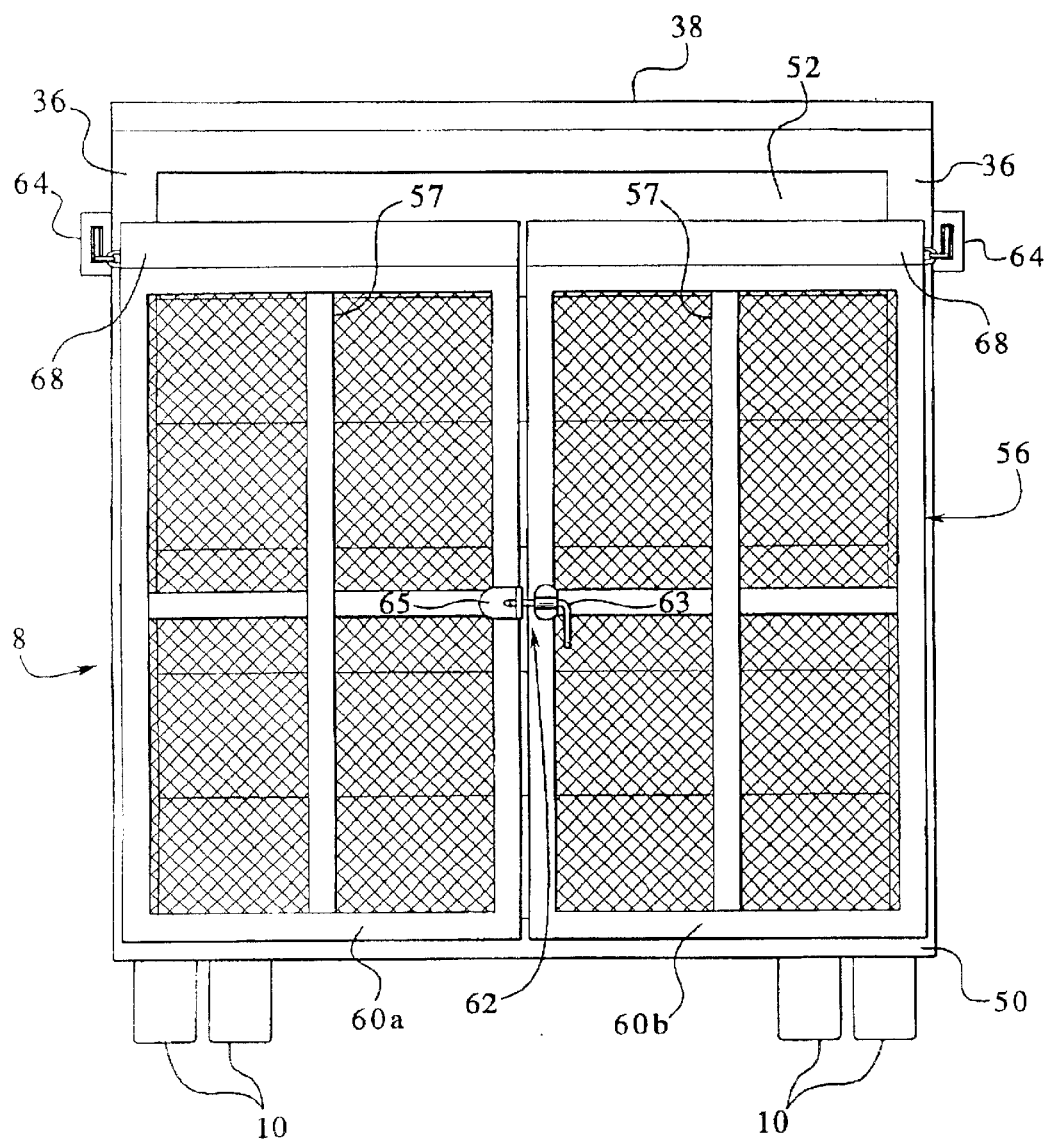
FIG. 4 illustrates a rear view of the truck in an embodiment of the present invention.

The ramp 56 may be attached to the rear end 50 of the storage compartment 8. The ramp 56 may be constructed of any material apparent to those skilled in the art including, but not limited to, metal, wood, or the like. The ramp 56 may have beams 57 for supporting weight placed on the ramp 56. In an upright position, the ramp 56 may be positioned adjacent and parallel to the rear end 50 of the storage compartment 8 as illustrated in FIG. 4. In a lowered position, the ramp 56 leads into the interior 42 of the storage compartment 8 and is adjacent to the section 55. The slope of the section 55 provides assistance in loading and/or unloading from the storage compartment 8.

The ramp 56 may have sections 60a and 60b as illustrated in FIG. 4. The sections 60a and 60b may be locked together by a locking mechanism 62. The locking mechanism 62 may have a latch 63 which may be attached to the section 60b. The latch 63 may interlock with a female portion 65 attached to the section 60a. Alternatively, the latch 63 may be attached to the section 60a, and the female portion 65 may be attached to the section 60b. The sections 60a and 60b, when locked, may be moved simultaneously. If the sections 60a and 60b are not locked, the sections 60a and 60b may be moved independently.

The sections 60a and 60b may be connected to winches 64 located on the storage compartment 8 on the driver side 31 and the passenger side 29. The winches 64 may have a cord 66 that may extend from a top end 68 of each of the sections 60 and 60b. The cord 66 may be fastened to a hook 69 located at the top end 68 of each of the sections 60a and 60b. The winches 64 may enable the raising or lowering of the sections 60a and 60b by pulling or releasing the cord 66. In an embodiment, only one winch 64 is positioned on the storage compartment 8 and used to raise or lower the sections 60a and 60b, whether individually or simultaneously.

In an embodiment, the user may lower the sections 60a and 60b manually by contacting the sections 60a and 60b and positioning the sections 60a and 60b onto the ground 72. Conversely, the user may raise the sections 60a and 60b by contacting and positioning the sections 60a and 60b towards the rear end 50 of the storage compartment 8.

In an embodiment, the winches 64 may be controlled by the controller 23 within the interior 5 of the cab 4. The controller 23 may be able to operate the winches 64 simultaneously or independently. The user may raise or may lower the ramp 56 from within the interior 5 of the cab 4 by activating the controller 23. Alternatively, the winches 64 may be controlled by a controller 23 which may be located on the storage compartment 8 as illustrated in FIG. 2. The controller 23 may also operate the winches 64 simultaneously or independently.

Accordingly, the truck 2 of the present invention may provide advantages for an individual such as, for example, a landscaper. For example, the ramp 56 may allow a user to load or unload items, such as landscaping tools or equipment, from the storage compartment 8. Smaller-sized tools or equipment may be hung on the hooks 43 within the interior 42 of the storage compartment 8. Moreover, attachment of the ramp 56 to the storage compartment 8 may allow the user to avoid added labor to load or unload items or equipment. In addition, the dumping bin 6 may be operated from within the interior 5 of the cab. As a result, a landscaper may place waste within the dumping bin 6 and transport the waste to a dumping site. The user may then remain within the cab 4 during disposal of the waste. The consolidation of the dumping bin 6 and the storage compartment 8 onto a single truck 2 does not require any other vehicle or apparatus to perform functions such as loading, unloading and storing equipment; storing and disposing of waste products; and transporting equipment, tools, materials, waste or other items.

It should be understood that various changes and modifications to the presently preferred embodiments described herein will be apparent to those skilled in the art. Such changes and modifications may be made without departing from the spirit and scope of the present invention and without diminishing its attendant advantages.

We claim:

1. A truck comprising:

a cab having a body having walls defining an interior;

a bed extending along a horizontal plane between a front end and a rear end wherein the front end is closest to the cab and the rear end is furthest from the cab and further wherein the bed is defined along an axis extending from the front end to the rear end;

a dumping bin having walls and a base defining an interior wherein the dumping bin is positioned at the front end of the bed and further wherein the dumping bin moves in a direction perpendicular to the axis of the bed;

a cylinder between the bed and the base of the dumping bin wherein the cylinder moves the dumping bin;

a storage compartment having walls defining an interior positioned on the bed adjacent to the dumping bin; and a controller in communication with the cylinder wherein the controller is located within the interior of the cab and further wherein the controller is activated to move the dumping bin in the direction perpendicular to the axis of the bed.

2. The truck of claim 1 further comprising:

a retractable door providing access to the storage compartment.

3. The truck of claim 1 wherein the dumping bin is positioned between the cab and the storage compartment.

4. The truck of claim 1 further comprising:

a door providing access to the storage compartment.

5. The truck of claim 1 wherein the dumping bin and the storage compartment are attached to the bed.

6. The truck of claim 1 further comprising:

a section of the storage compartment extending from the interior of the storage compartment to an end of the storage compartment wherein the section has a declining slope.

7. A system comprising:

a cab having a body and walls defining an interior wherein the cab has a bed extending from the body between a first end and a second end defining an axis of the bed;

a dumping bin having a body defined by bin walls and a base wherein the dumping bin is positioned on the bed and moves perpendicular to the axis;

a cylinder between the bed and the dumping bin;

a panel having a top and a bottom opposite to the top wherein the panel is positioned on the dumping bin between one of the bin walls and the base wherein the top of the panel is connected to the dumping bin and further wherein the bottom of the panel is adjacent to the base of the dumping bin; and a controller positioned within the cab wherein the controller is in communication with the cylinder and causes the cylinder to move the dumping bin.

8. The system of claim 7 further comprising:

a storage compartment having walls defining an interior positioned on the bed adjacent to the dumping bin.

9. The system of claim 7 further comprising:

a retractable door positioned adjacent to the bed.

10. The system of claim 7 wherein the panel may be moved into a position and locked in the position.

11. A truck comprising:

a cab having a body having walls defining an interior;

a bed extending along a horizontal plane between a front end and a rear end wherein the front end is closest to the cab and the rear end is furthest from the cab and further wherein the bed is defined along an axis extending from the front end to the rear end;

a dumping bin having walls and a base defining an interior wherein the dumping bin is positioned at the front end of the bed and further wherein the dumping bin moves in a direction perpendicular to the axis of the bed;

a cylinder positioned adjacent to the base of the dumping bin wherein the cylinder moves the dumping bin;

a storage compartment having walls defining an interior positioned on the bed adjacent to the dumping bin;

a controller in communication with the cylinder wherein the controller is located within the interior of the cab and further wherein the controller is activated to move the dumping bin in the direction perpendicular to the axis of the bed; and a ramp attached to the storage compartment.

12. A truck comprising:

a cab having a body having walls defining an interior;

a bed extending along a horizontal plane between a front end and a rear end wherein the front end is closest to the cab and the rear end is furthest from the cab and further wherein the bed is defined along an axis extending from the front end to the rear end;

a dumping bin having walls and a base defining an interior wherein the dumping bin is positioned at the front end of the bed and further wherein the dumping bin moves in a direction perpendicular to the axis of the bed;

a cylinder positioned adjacent to the base of the dumping bin wherein the cylinder moves the dumping bin;

a storage compartment having walls defining an interior positioned on the bed adjacent to the dumping bin;

a controller in communication with the cylinder wherein the controller is located within the interior of the cab and further wherein the controller is activated to move the dumping bin in the direction perpendicular to the axis of the bed; and a winch attached to the storage compartment wherein the winch is controlled by the controller.

13. A truck comprising:

a cab having a body having walls defining an interior;

a bed extending along a horizontal plane between a front end and a rear end wherein the front end is closest to the cab and the rear end is furthest from the cab and further wherein the bed is defined along an axis extending from the front end to the rear end;

a dumping bin having walls and a base defining an interior wherein the dumping bin is positioned at the front end of the bed and further wherein the dumping bin moves in a direction perpendicular to the axis of the bed;

a cylinder positioned adjacent to the base of the dumping bin wherein the cylinder moves the dumping bin;

a storage compartment having walls defining an interior positioned on the bed adjacent to the dumping bin;

a controller in communication with the cylinder wherein the controller is located within the interior of the cab and further wherein the controller is activated to move the dumping bin in the direction perpendicular to the axis of the bed; and a panel on the dumping bin wherein the panel is controlled by the controller.

14. A truck comprising:

a cab having a body having walls defining an interior;

a bed extending along a horizontal plane between a front end and a rear end wherein the front end is closest to the cab and the rear end is furthest from the cab and further wherein the bed is defined along an axis extending from the front end to the rear end;

a dumping bin having walls and a base defining an interior wherein the dumping bin is positioned at the front end of the bed and further wherein the dumping bin moves in a direction perpendicular to the axis of the bed;

a cylinder positioned adjacent to the base of the dumping bin wherein the cylinder moves the dumping bin;

a storage compartment having walls defining an interior positioned on the bed adjacent to the dumping bin;

a controller in communication with the cylinder wherein the controller is located within the interior of the cab and further wherein the controller is activated to move the dumping bin in the direction perpendicular to the axis of the bed; and a ramp attached to the storage compartment wherein the ramp has a first section and a second section wherein each of the first section and the second section is independently movable.

15. A system comprising:

a cab having a body and walls defining an interior wherein the cab has a bed extending from the body between a first end and a second end defining an axis of the bed;

a dumping bin having a body defined by bin walls and a base wherein the dumping bin is positioned on the bed and moves perpendicular to the axis;

a cylinder positioned between the bed and the dumping bin;

a panel positioned on the dumping bin between one of the bin walls and the base;

a controller positioned within the cab wherein the controller is in communication with the cylinder and causes the cylinder to move the dumping bin; and a ramp positioned adjacent to the bed.

16. A system comprising:

a cab having a body and walls defining an interior wherein the cab has a bed extending from the body between a first end and a second end defining an axis of the bed;

a dumping bin having a body defined by bin walls and a base wherein the dumping bin is positioned on the bed and moves perpendicular to the axis;

a cylinder positioned between the bed and the dumping bin;

a panel positioned on the dumping bin between one of the bin walls and the base;

a controller positioned within the cab wherein the controller is in communication with the cylinder and causes the cylinder to move the dumping bin; and a winch in communication with the controller.

* * * * *